(12) United States Patent
Fulcher

(10) Patent No.: US 12,037,133 B2
(45) Date of Patent: Jul. 16, 2024

(54) SHIELDING ARRANGEMENT FOR AIRCRAFT WIRING

(71) Applicant: AIRBUS SAS, Blagnac (FR)

(72) Inventor: Thomas Fulcher, Bristol (GB)

(73) Assignee: AIRBUS SAS, Blagnac (FR)

( * ) Notice: Subject to any disclaimer, the term of this patent is extended or adjusted under 35 U.S.C. 154(b) by 43 days.

(21) Appl. No.: 18/071,862

(22) Filed: Nov. 30, 2022

(65) Prior Publication Data

US 2023/0166861 A1    Jun. 1, 2023

(30) Foreign Application Priority Data

Nov. 30, 2021  (GB) ...................................... 2117269

(51) Int. Cl.
*B64D 45/02* (2006.01)
*B64D 27/24* (2024.01)
*B64D 27/40* (2024.01)
*H01B 9/02* (2006.01)
*H02K 7/18* (2006.01)

(52) U.S. Cl.
CPC ............. *B64D 45/02* (2013.01); *B64D 27/24* (2013.01); *B64D 27/40* (2024.01); *H01B 9/02* (2013.01); *H02K 7/1807* (2013.01); *B64D 2221/00* (2013.01)

(58) Field of Classification Search
CPC ........ B64D 45/02; B64D 27/24; B64D 27/40; B64D 2221/00; H01B 9/02; H02K 7/1807; H01R 4/60; H02G 3/00; H02G 3/02; H02G 3/03; H02G 3/04; H02G 3/0406; H02G 3/06; H02G 3/22; H02G 3/0412

See application file for complete search history.

(56) References Cited

U.S. PATENT DOCUMENTS

| | | | | |
|---|---|---|---|---|
| 3,798,346 | A * | 3/1974 | Kreuzer | H01B 7/426 |
| | | | | 174/15.6 |
| 8,708,280 | B2 * | 4/2014 | Blanchard | H01B 7/065 |
| | | | | 244/131 |
| 9,640,959 | B2 | 5/2017 | Pickard et al. | |
| 10,422,301 | B2 | 9/2019 | Karnofski et al. | |
| 10,826,247 | B1 * | 11/2020 | Gilbert | H02G 3/083 |

(Continued)

FOREIGN PATENT DOCUMENTS

| | | |
|---|---|---|
| CN | 210430351 | 4/2020 |
| EP | 2 397 404 | 12/2011 |

(Continued)

OTHER PUBLICATIONS

WO2020212656A1 Translation (Year: 2020).*

(Continued)

*Primary Examiner* — Christopher D Hutchens
*Assistant Examiner* — Steven J Shur
(74) *Attorney, Agent, or Firm* — Nixon & Vanderhye P.C.

(57) ABSTRACT

An aircraft is disclosed include wiring configured to carry electrical power; and an electromagnetic shielding arrangement which provides an enclosure around the wiring and is configured to block electromagnetic emissions from the wiring. The electromagnetic shielding arrangement includes a first shield; a second shield which can move relative to the first shield; and a gap between overlapping portions of the shields. The gap is configured to enable air to flow into or out of the enclosure via the gap.

17 Claims, 4 Drawing Sheets

(56) References Cited

U.S. PATENT DOCUMENTS

| | | |
|---|---|---|
| 2010/0327111 A1 | 12/2010 | Sanderson |
| 2016/0111885 A1 | 4/2016 | Roques et al. |
| 2017/0016413 A1* | 1/2017 | Karnofski ................. F02K 1/16 |
| 2020/0243458 A1* | 7/2020 | Yoshioka ............ H01L 31/0203 |
| 2022/0416450 A1* | 12/2022 | Sandin ..................... H02B 1/54 |
| 2023/0150674 A1* | 5/2023 | Donovan ............... B64D 33/08 |
| | | 165/96 |
| 2023/0415903 A1* | 12/2023 | Bolam ................... B64D 27/24 |
| 2024/0043132 A1* | 2/2024 | Law ........................ B60L 58/33 |

FOREIGN PATENT DOCUMENTS

| | | | |
|---|---|---|---|
| EP | 2 991 895 | 3/2016 | |
| EP | 3 686 937 | 7/2020 | |
| GB | 2599726 | 4/2022 | |
| WO | 2020/212656 | 10/2020 | |
| WO | WO-2020212656 A1 * | 10/2020 | ............. B64C 27/08 |

OTHER PUBLICATIONS

UKIPO Combined Search and Examination Report for GB2117269. 7, dated May 27, 2022, 8 pages.
Extended European Search Report for Application No. EP 22208740. 5, nine pages, dated May 2, 2023.

* cited by examiner

SHIELDING ARRANGEMENT FOR AIRCRAFT WIRING

CROSS RELATED APPLICATION

This application claims priority to United Kingdom Patent Application GB 2117269.7 filed Nov. 30, 2021, the entire contents of which is hereby incorporated by reference.

FIELD OF THE INVENTION

The present invention relates to an aircraft, or an aircraft propulsion system, with wiring configured to carry electrical power, and an electromagnetic shielding arrangement which provides an enclosure around the wiring.

BACKGROUND OF THE INVENTION

The delivery of electric power in an aircraft can be difficult, particularly where the power must be delivered between components which are liable to move relative to each other during flight of the aircraft.

SUMMARY OF THE INVENTION

A first aspect of the invention provides an aircraft comprising: wiring configured to carry electrical power; and an electromagnetic shielding arrangement which provides an enclosure around the wiring and is configured to block electromagnetic emissions from the wiring, the electromagnetic shielding arrangement comprising: a first shield; a second shield which can move relative to the first shield; and a gap between overlapping portions of the shields, wherein the gap is configured to enable air to flow into or out of the enclosure via the gap.

Optionally the aircraft further comprises a propulsion motor, wherein the wiring is configured to carry electrical power for the propulsion motor.

Optionally the aircraft further comprises a wing; an engine structure including the propulsion motor; and a pylon connecting the engine structure to the wing, wherein the first shield is connected to the pylon and the second shield is connected to the engine structure.

Optionally the aircraft further comprises a rectifier and a generator, wherein the wiring connects the rectifier to the generator, one of the shields is connected to the rectifier, and the other shield is connected to the generator.

Optionally the wiring is configured to generate electromagnetic emissions at a signal wavelength; and the gap has a dimension which is less than the signal wavelength, thereby inhibiting transmission of the electromagnetic emissions through the gap.

Optionally the gap has a dimension which is less than the signal wavelength at all points.

Optionally the gap has a dimension which is greater than 1 mm.

Optionally the shields are metallic.

Optionally the gap is configured to enable air to flow into the enclosure via the gap and into contact with the wiring, thereby cooling the wiring.

Optionally the gap comprises a channel with parallel walls.

Optionally the wiring comprises first wiring configured to carry electrical power at a first phase; second wiring configured to carry electrical power at a second phase; and third wiring configured to carry electrical power at a third phase.

Optionally the first, second and third wiring are surrounded by common harness shielding outside the enclosure; and the common harness shielding is terminated so that the common harness shielding does not extend inside the enclosure.

Optionally the wiring is configured to carry electrical power at a first phase; and the aircraft propulsion system further comprises: second wiring configured to carry electrical power at a second phase; and a second electromagnetic shielding arrangement which provides a second enclosure around the second wiring and is configured to block electromagnetic emissions from the second wiring, the second electromagnetic shielding arrangement comprising: a third shield; a fourth shield which can move relative to the third shield; and a second gap between the third shield and the fourth shield, wherein the second gap is configured to enable air to flow into or out of the second enclosure via the second gap, thereby cooling the second wiring.

Optionally the wiring is configured to carry electrical power at a power level higher than 100 kW, or at a power level higher than 1 MW.

A second aspect of the invention provides an aircraft propulsion system comprising: a propulsion motor; wiring configured to carry electrical power for the propulsion motor; and an electromagnetic shielding arrangement which provides an enclosure around the wiring and is configured to block electromagnetic emissions from the wiring, the electromagnetic shielding arrangement comprising: a first shield; a second shield which can move relative to the first shield; and a gap between the first shield and the second shield, wherein the gap is configured to enable air to flow into or out of the enclosure via the gap.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
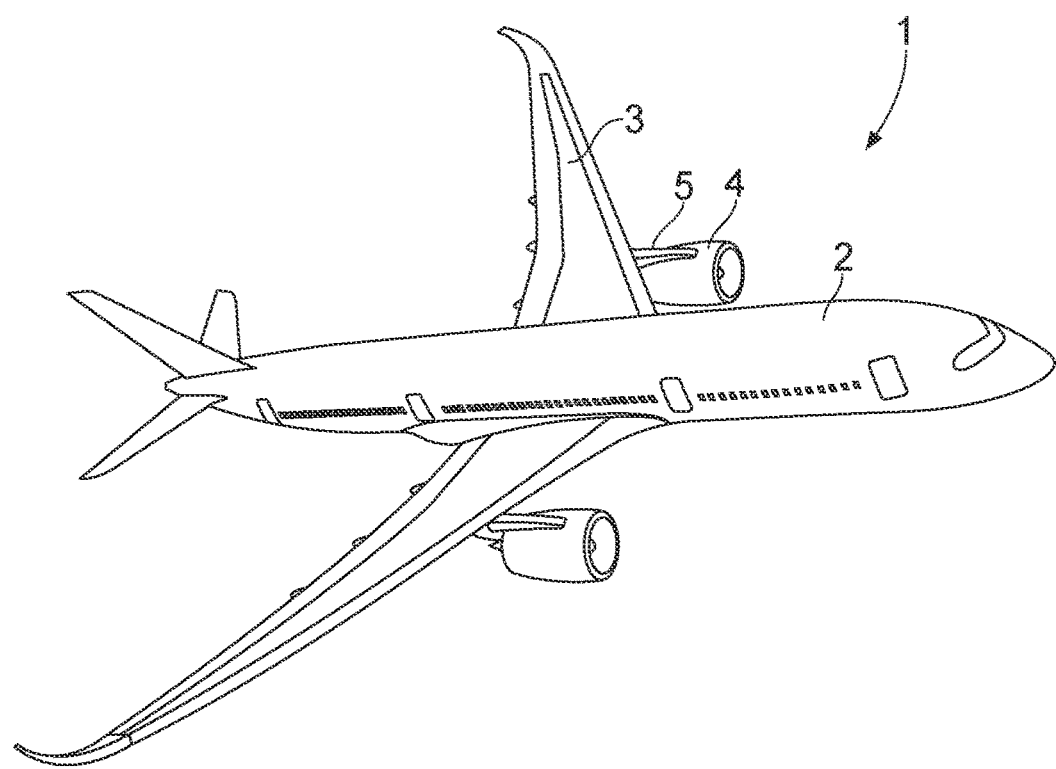
FIG. 1 shows an aircraft.

An aircraft 1 shown in FIG. 1 comprises a fuselage 2 and a pair of wings 3. Each wing 3 carries a respective engine structure 4 on a pylon 5.

Figure 2:
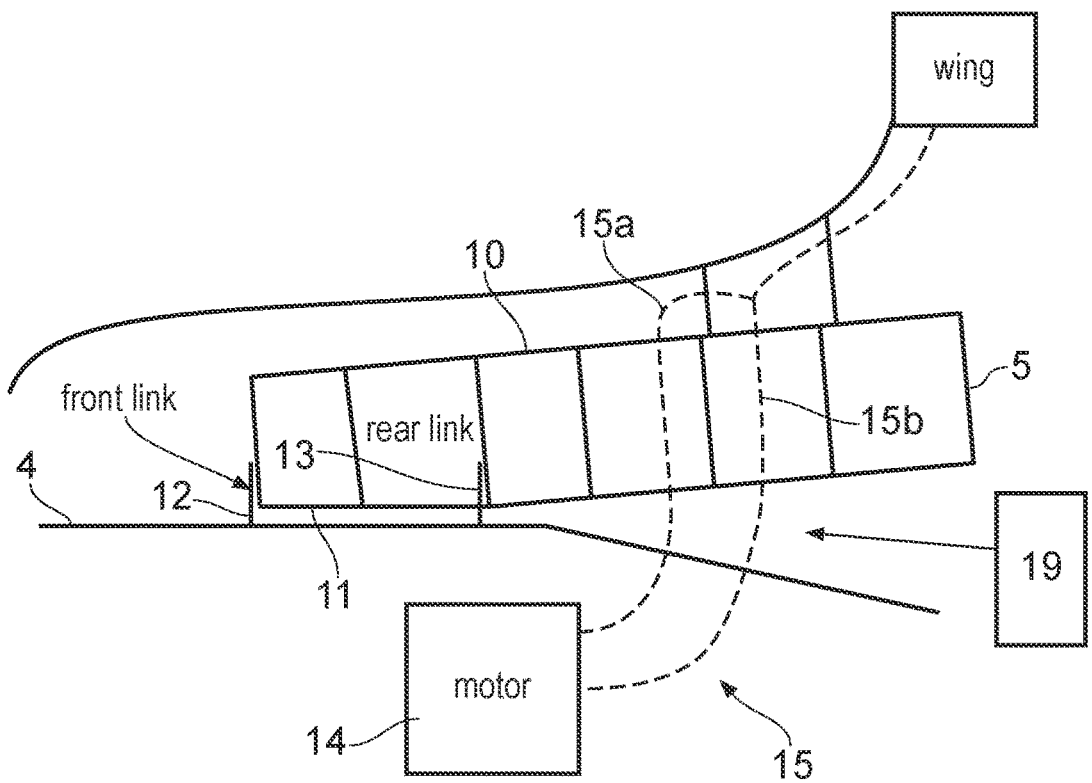
FIG. 2 is a schematic view showing an engine/wing interface from the side.

FIG. 2 is a schematic view showing the interface between the engine structure 4 and the wing 3. The pylon 5 has a pylon top spar 10 and a pylon bottom spar 11. The pylon bottom spar 11 is attached to the engine structure 4 by a front link 12 and a rear link 13.

The engine structure 4 comprises a propulsion motor 14 which is configured to drive a propulsor (not shown) such as a fan, which generates thrust to propel the aircraft.

Figure 3:
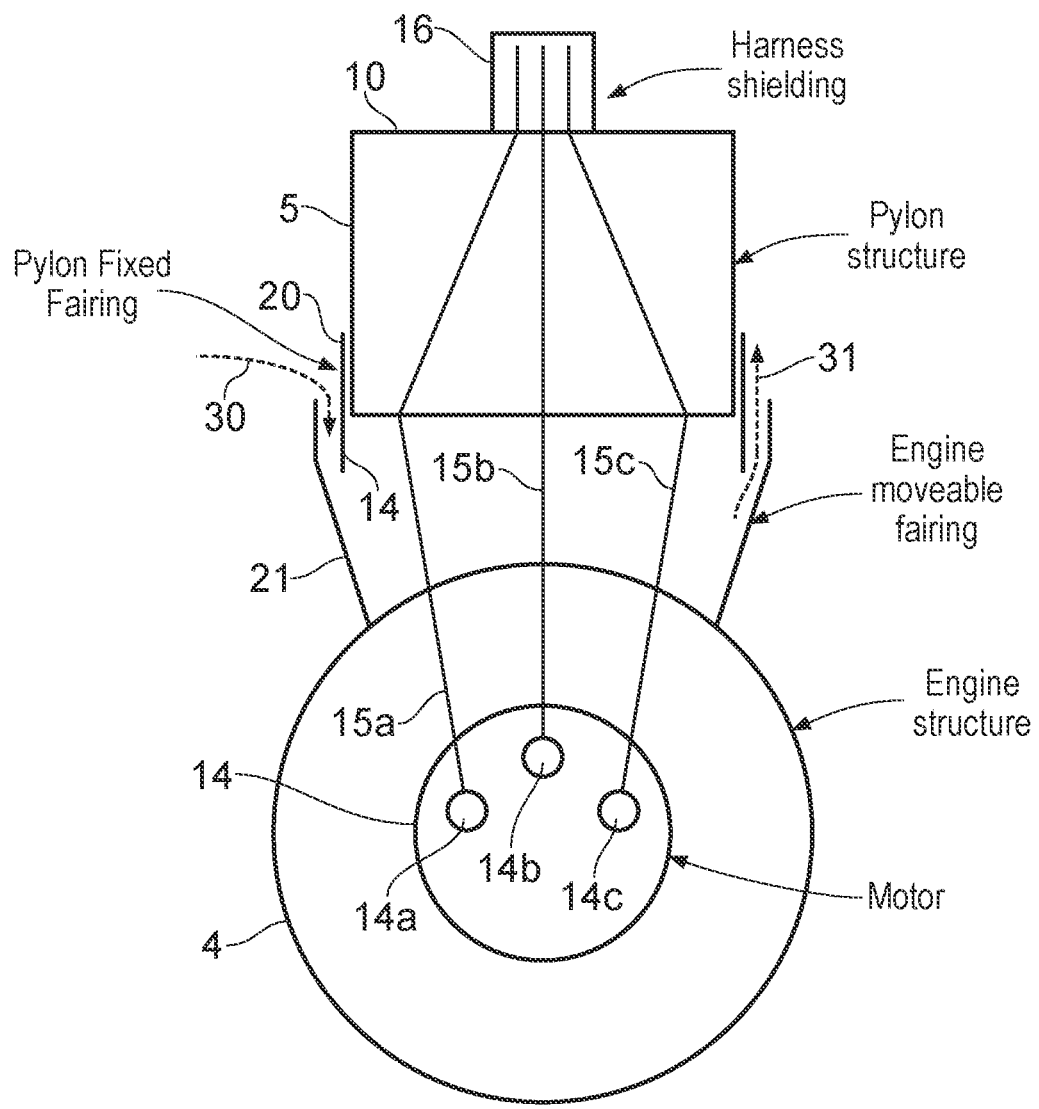
FIG. 3 is a schematic view showing the engine/wing interface from the front.

Very high levels of electrical power must be delivered to the propulsion motor 14 by wiring 15 shown in FIGS. 2 and 3. In some embodiments the wiring 15 is configured to carry electrical power at a power level higher than 100 kW, or at a power level higher than 1 MW. For example, the wiring 15 may be configured to carry electrical power at a power level of 2 MW or much higher—potentially as high as 20 MW.

The wiring 15 comprises first wiring 15a configured to carry electrical power at a first phase to a first motor terminal 14a; second wiring 15b configured to carry electrical power at a second phase to a second motor terminal 14b; and third wiring 15c configured to carry electrical power at a third phase to a third motor terminal 14c. For ease of illustration, FIG. 2 shows only the first and second wiring 15a, 15b, whereas FIG. 3 shows all three phases 15a-c of the wiring 15.

For three-phase AC communication, it is best for electromagnetic interference (EMI) purposes to put three wires of different phase together under common harness shielding as the phase difference of each wire cancels out the overall emission. This is called a trefoil configuration.

The first, second and third wiring 15a-c may be arranged in a trefoil configuration, surrounded by common harness shielding 16 shown in FIG. 3.

The trefoil configuration works well for the majority of routing through the aircraft, but it can create a routing problem when it becomes necessary to connect the wiring to equipment at either end. Also, to transmit high currents it may be necessary to have more than one wire per phase (for instance three wires per phase).

Figure 4:
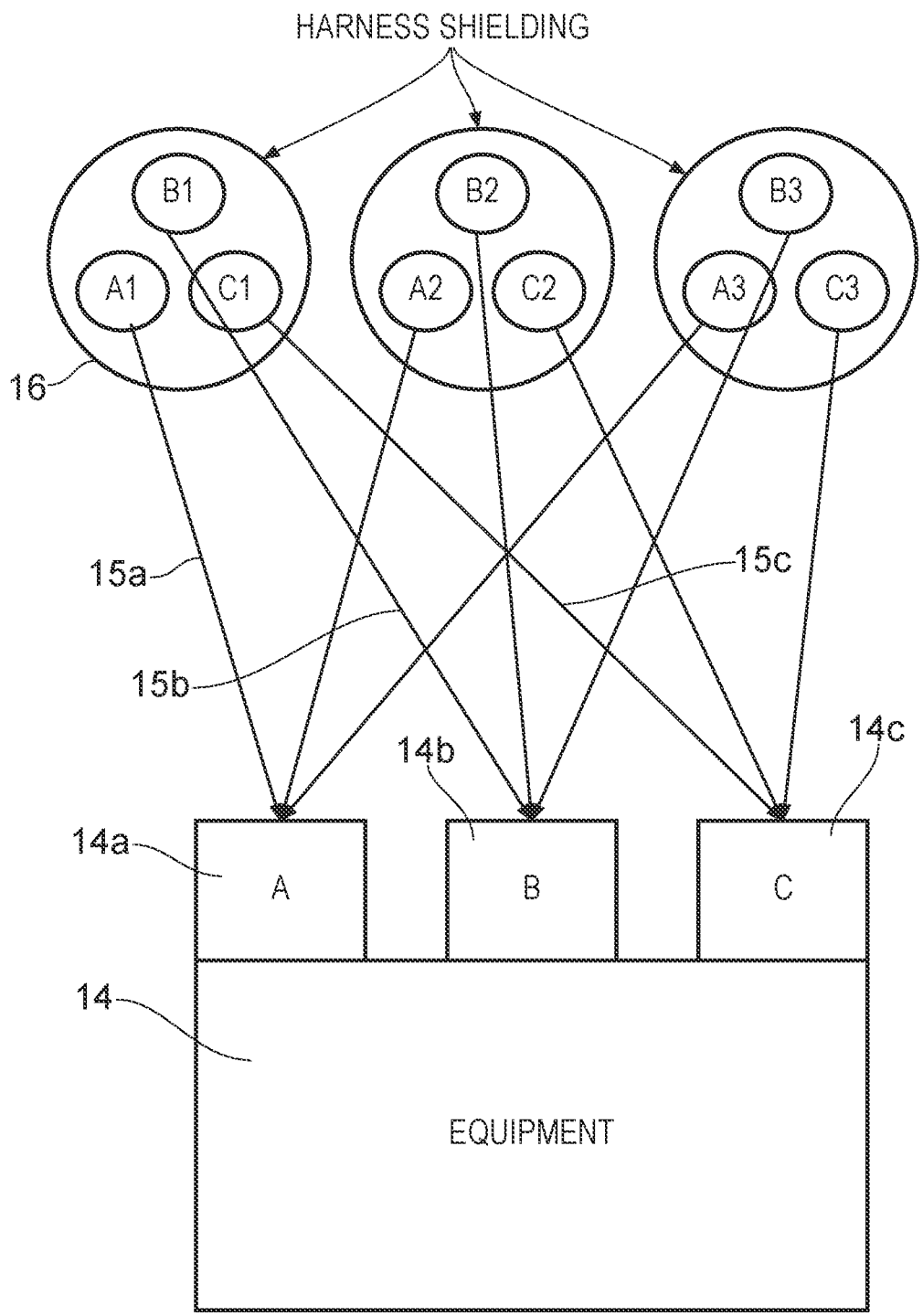
FIG. 4 shows a propulsion system power delivery arrangement with nine wires.

An example of this routing problem is shown in FIG. 4. FIGS. 2 and 3 show an embodiment with only a single wire 15a-c per phase. FIG. 4 shows an embodiment in which the wires 15a-c are connected to motor terminals 14a-c, along with two further sets of wiring. It is necessary to terminate the common harness shielding 16 and connect each wire to the correct terminal 14a-c as shown in FIG. 4.

With the very large diameter wires required for high power current transmission, the connection arrangement of FIG. 4 takes up a lot of distance and space. The lack of common harness shielding around the wiring, and the effect of not having the wires in a trefoil configuration, leads to an area 19 (shown in FIG. 2) between the pylon 5 and the engine structure 4 with very high EMI emissions which can interfere with aircraft communications and other wiring.

A conventional solution to resolve this from an EMI perspective would be to contain the wiring 15 inside a conductive box. However, a closed metallic box can create a thermal problem as the wiring 15 generates a lot of heat.

Also, the shape of the pylon 5 is critical to drag, and the engine structure 4 has many systems to install in a small volume. This makes it challenging to route the wiring 15 to the propulsion motor 14.

In this example the common harness shielding 16 is terminated at the pylon top spar 10, as shown in FIG. 3, and the individual wires 15a-c run through the pylon 5 so they are in the right location when they reach the engine structure 4. As mentioned above, this creates the risk of high electromagnetic emissions in the area 19 between the pylon 5 and the engine structure 4.

An added complication is that the wiring 15 is behind the front link 12 and the rear link 13. This means the engine structure 4 will be vibrating and moving relative to the pylon 5 at that point.

To solve these problems, an electromagnetic shielding arrangement 20, 21 shown in FIG. 3 is provided. The electromagnetic shielding arrangement comprises a first shield 20 connected to the pylon 5, and a second shield 21 connected to the engine structure 4.

The electromagnetic shielding arrangement 20, 21 provides an enclosure around the wiring 15 which is configured to block electromagnetic emissions from the wiring 15.

In the case of FIG. 3, only three wires 15a-c are shown inside the electromagnetic shielding arrangement 20, 21, but in the case of FIG. 4 all nine wires may be enclosed by the electromagnetic shielding arrangement 20, 21.

The shields 20, 21 are also positioned to be contacted by external airflow when the aircraft is in flight, so they are shaped to act as low drag aerodynamic fairings.

In this example the first shield 20 is inside the second shield 21, although in other embodiments the reverse may be true.

The shields 20, 21 may be metallic, for instance Aluminium.

Figure 5:
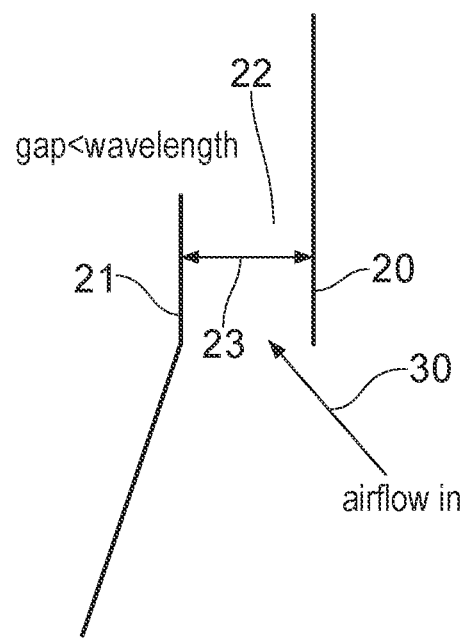
FIG. 5 shows a gap between a pair of shields.

A gap 22 shown in FIG. 5 is provided between overlapping portions of the first shield 20 and the second shield 21. The gap 22 is configured to enable cold air 30 (shown in FIGS. 3 and 5) to flow into the enclosure via the gap 22 and into contact with the wiring 15, thereby cooling the wiring 15. The cold air 30 may be at a temperature as low as −55° C. The gap 22 is also configured to enable hot air 31 to flow out of the enclosure via the gap 22 as shown in FIG. 3. The hot air may be at a temperature as high as 180° C.

As shown in FIG. 5, the gap 22 may comprise a channel with parallel planar walls.

The wiring 15 is flexible, and the gap 22 enables the second shield 21 to move relative to the first shield 20, which solves the problem of dealing with the vibration of the engine structure 4 relative to the pylon 5.

The gap 22 not only allows the two shields to move easily relative to each other, but also provides a small channel or waveguide for electromagnetic radiation.

The wiring 15 is configured to generate electromagnetic emissions at a signal wavelength. By way of example, the frequency of the electromagnetic emissions may be kHz to ~20 or 30 MHz, so the shortest signal wavelengths will be a little shorter than 10 m.

The gap 22 may have a dimension 23 which is less than the signal wavelength, thereby inhibiting transmission of the electromagnetic emissions through the gap 22. Optionally the gap 22 has a dimension which is less than the signal wavelength at all points where the shields 20, 21 overlap.

The aircraft 1 may contain a communication network which is sensitive to electromagnetic emissions at much lower wavelengths, and the dimension 23 of the gap 22 may also be made sufficiently small to inhibiting transmission of electromagnetic emissions through the gap 22 at such lower wavelengths, in order to protect the communication network.

To enable sufficient flow of air, the gap 22 may have a dimension 23 which is greater than 1 mm, optionally at all points where the shields 20, 21 overlap.

The dimension 23 of the gap may vary in flight due to relative movement between the shields 20, 21. In this case, the dimension 23 of the gap will vary over time between a minimum and a maximum. The minimum dimension may be greater than 1 mm, so the gap 22 is sufficiently wide under all conditions.

At the leading edge of the enclosure, the gap 22 may be open to enable cold air to flow directly into the enclosure during flight. This maximizes ventilation of the enclosure but may create high drag. A lower drag alternative is to close off the leading edge of the gap 22 with a flexible seal between the shields, but this will result in a lower rate of flow into the enclosure.

The dimension 23 of the gap will have an impact on drag—a higher dimension 23 resulting in a higher drag. Typically, the dimension 23 of the gap is of the order of 2 mm, although it may be higher if required. Optionally the dimension 23 of the gap is less than 20 mm or less than 10 mm.

In the embodiment of FIG. 3 the first shield 20 is a component which is attached to the pylon 5 and extends away from the pylon across the area 19 between the pylon 5 and the engine structure 4. In an alternative embodiment of the invention, the second shield 21 may fit inside a slot in the pylon 5. In this case the electromagnetic shielding arrangement comprises a first shield (formed by a wall of the slot in the pylon 5); a second shield 21 which crosses the area 19 and fits inside the slot in the pylon 5; and a gap between overlapping portions of the shields.

In another alternative embodiment of the invention, the second shield 20 may fit inside a slot in the engine structure 4. In this case the electromagnetic shielding arrangement comprises a first shield which crosses the area 19 and fits inside the slot in the engine structure 4; a second shield (formed by a wall of the slot in the engine structure 4); and a gap between overlapping portions of the shields.

With these alternative embodiments it may be more difficult for air to flow into the enclosure via the gap, but the flow of air out of the enclosure via the gap will still be possible.

Figure 6:
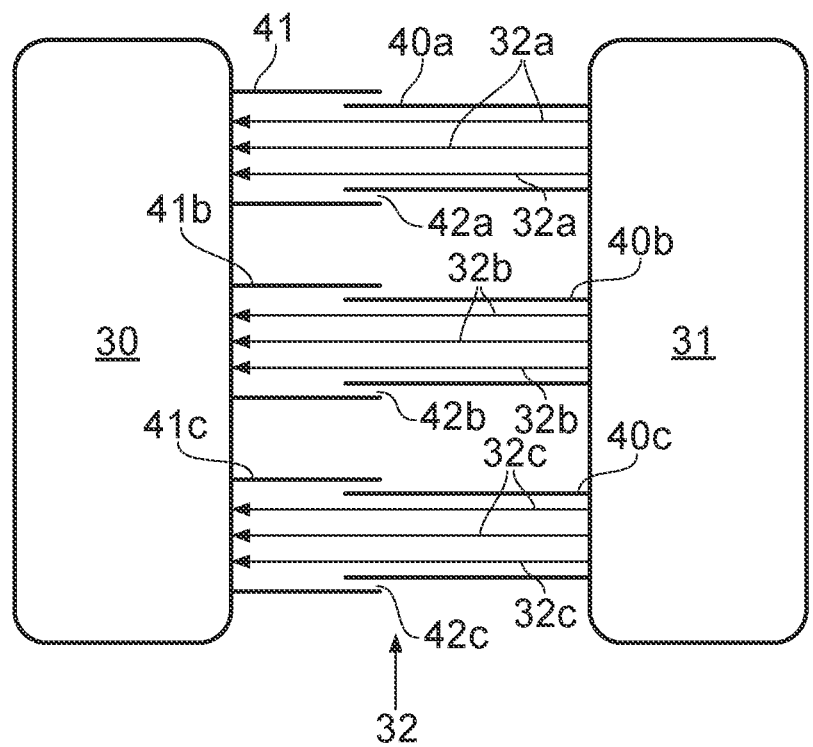
FIG. 6 shows wiring between a rectifier and a generator.

FIG. 6 shows a further embodiment of the present invention. The aircraft propulsion system of the aircraft 1 comprises a rectifier 30 and a generator 31, positioned close to each other in the fuselage 2.

Wiring 32 shown in FIG. 6 connects the rectifier 30 to the generator 31. Like the wiring 15 between the pylon 5 and engine structure 4, the wiring 32 is also configured to carry high levels of electrical power which is ultimately delivered to the motor. In this case the electrical power is generated by the generator 31, then carried to the propulsion motor 14 by the wiring 32 via the rectifier 30 and potentially other electrical components of the aircraft propulsion system.

The wiring 32 comprises three sets of wiring: first wiring 32a configured to carry electrical power at a first phase; second wiring 32b configured to carry electrical power at a second phase; and third wiring 32c configured to carry electrical power at a third phase. In this example each set of wiring comprises three wires.

The rectifier 30 and generator 31 are attached to different supports, so they can move relative to each other. To accommodate this relative movement, the wiring 32 is flexible.

As the rectifier 30 and generator 31 are very close to each other, it is not possible to bundle the wiring as three-phase cables in a trefoil configuration, so the wires are routed individually as shown in FIG. 6.

This creates an EMI problem, with wires of the same phase grouped together. The solution to this problem is to provide separate electromagnetic shielding arrangements for each set of wiring.

A first electromagnetic shielding arrangement provides a first enclosure around the first wiring 32a and is configured to block electromagnetic emissions from the first wiring 32a. The first electromagnetic shielding arrangement comprises: a first shield 40a; a second shield 41a which can move relative to the first shield 40a; and a first gap 42a between overlapping portions of the first shield 40a and the second shield 41a. The first gap 42a is configured to enable air to flow into and out of the first enclosure via the first gap.

A second electromagnetic shielding arrangement provides a second enclosure around the second wiring 32b, similar to the first enclosure 40a, 41a. The second enclosure is configured to block electromagnetic emissions from the second wiring 32b. The second electromagnetic shielding arrangement comprises: a third shield 40b; a fourth shield 41b which can move relative to the third shield 40b; and a second gap 42b between the third shield 40b and the fourth shield 41c. The second gap 42b is configured to enable air to flow into and out of the second enclosure via the second gap.

A third electromagnetic shielding arrangement provides a third enclosure around the third wiring 32c and is configured to block electromagnetic emissions from the third wiring 32c. The third electromagnetic shielding arrangement comprises: a fifth shield 40c; a sixth shield 41c which can move relative to the fifth shield 40c; and a third gap 42c between overlapping portions of the fifth shield 40c and the sixth shield 41c. The third gap is configured to enable air to flow into and out of the third enclosure via the gap.

The gaps 42a-c each provide a ventilation effect similar to the ventilation effect of the gap 22 in the first embodiment, preventing overheating of the wiring 32.

Each of the shields 40a-c is connected to the generator 31 and each of the shields 41a-c is connected to the rectifier 30.

In this example the shields 40a-c are inside the shields 41a-c, although in other embodiments the reverse may be true.

The shields 40a-c and 41-c may be cylindrical, with parallel walls.

The shields 40a-c and 41a-c may be metallic, for instance Aluminium.

The wiring 32 is configured to generate electromagnetic emissions at a signal wavelength. By way of example, the frequency of the electromagnetic emissions may be kHz to ~20 or 30 MHz, so the shortest signal wavelengths will be a little shorter than 10 m.

Each gap 42a-c has a dimension which is less than the signal wavelength, thereby inhibiting transmission of the electromagnetic emissions through the gap. Preferably each gap 42a-c has a dimension which is less than the signal wavelength at all points where the shields 40a-c and 41a-c overlap.

To enable sufficient flow of air, each gap 42a-c may have a dimension which is greater than 1 mm, optionally at all points where the shields 40a-c and 41a-c overlap.

The electromagnetic shielding arrangements of FIG. 6 are not on the exterior of the aircraft, and hence they have no impact on the drag performance of the aircraft. This enables the dimensions of the gaps 42a-c to be higher than in the embodiment of FIG. 3.

In the embodiment of FIG. 6 each shield 40a-c is a component which is attached to the generator 31 and extends away from the body of the generator 31. In an alternative embodiment of the invention, each shield 41a-c may fit inside a respective slot in the generator 31. In this case each electromagnetic shielding arrangement comprises a first shield (formed by a wall of the slot in the generator 31); a second shield which fits inside the slot in the generator 31; and a gap between overlapping portions of the shields.

In another alternative embodiment of the invention, each shield 40a-c may fit inside a respective slot in the rectifier 30. In this case the electromagnetic shielding arrangement comprises a first shield which fits inside the slot in the rectifier 30; a second shield (formed by a wall of the slot in the rectifier 30); and a gap between overlapping portions of the shields.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft comprising: wiring configured to carry electrical power; and
an electromagnetic shielding arrangement which provides an enclosure around the wiring and is configured to block electromagnetic emissions from the wiring, the electromagnetic shielding arrangement comprising: a first shield; a second shield which can move relative to the first shield; and a gap between overlapping portions of the shields, wherein the gap is configured to enable air to flow into the enclosure via the gap and into contact with the wiring, thereby cooling the wiring.

2. An aircraft according to claim 1, further comprising a propulsion motor, wherein the wiring is configured to carry electrical power for the propulsion motor.

3. An aircraft according to claim 2, further comprising: a wing; an engine structure including the propulsion motor; and a pylon connecting the engine structure to the wing, wherein the first shield is connected to the pylon and the second shield is connected to the engine structure.

4. An aircraft according to claim 1, further comprising a rectifier and a generator, wherein the wiring connects the rectifier to the generator, one of the shields is connected to the rectifier, and the other shield is connected to the generator.

5. An aircraft according to claim 1, wherein the wiring is configured to generate electromagnetic emissions at a signal wavelength; and the gap has a dimension which is less than the signal wavelength, thereby inhibiting transmission of the electromagnetic emissions through the gap.

6. An aircraft according to claim 5, wherein the gap has a dimension which is less than the signal wavelength at all points.

7. An aircraft according to claim 1, wherein the gap has a dimension which is greater than 1 mm.

8. An aircraft according to claim 1, wherein the shields are metallic.

9. An aircraft according to claim 1, wherein the gap is configured to enable air to flow out of the enclosure via the gap.

10. An aircraft according to claim 1, wherein the gap comprises a channel with parallel walls.

11. An aircraft according to claim 1, wherein the wiring comprises first wiring configured to carry electrical power at a first phase; second wiring configured to carry electrical power at a second phase; and third wiring configured to carry electrical power at a third phase.

12. An aircraft according to claim 11, wherein the first, second and third wiring are surrounded by common harness shielding outside the enclosure; and the common harness shielding is terminated so that the common harness shielding does not extend inside the enclosure.

13. An aircraft according to claim 1, wherein the wiring is configured to carry electrical power at a first phase; and the aircraft propulsion system further comprises: second wiring configured to carry electrical power at a second phase; and a second electromagnetic shielding arrangement which provides a second enclosure around the second wiring and is configured to block electromagnetic emissions from the second wiring, the second electromagnetic shielding arrangement comprising: a third shield; a fourth shield which can move relative to the third shield; and a second gap between the third shield and the fourth shield, wherein the second gap is configured to enable air to flow into or out of the second enclosure via the second gap, thereby cooling the second wiring.

14. An aircraft according to claim 1, wherein the wiring is configured to carry electrical power at a power level higher than 100 kW, or at a power level higher than 1 MW.

15. An aircraft propulsion system comprising: a propulsion motor; wiring configured to carry electrical power for the propulsion motor; and an electromagnetic shielding arrangement which provides an enclosure around the wiring and is configured to block electromagnetic emissions from the wiring, the electromagnetic shielding arrangement comprising: a first shield; a second shield which can move relative to the first shield; and a gap between the first shield and the second shield, wherein the gap is configured to enable air to flow into the enclosure via the gap and into contact with the wiring, thereby cooling the wiring.

16. An aircraft according to claim 1, wherein the gap is configured to enable air to flow out of the enclosure via the gap.

17. An aircraft propulsion system according to claim 15, wherein the gap is configured to enable air to flow out of the enclosure via the gap.

* * * * *